(12) United States Patent
Englehart

(10) Patent No.: US 6,385,929 B1
(45) Date of Patent: May 14, 2002

(54) LOG AND SCREW PIN BUILDING SYSTEM

(76) Inventor: Richard J. Englehart, 18008 Owen Rd., Middlefield, OH (US) 44062

( * ) Notice: Subject to any disclaimer, the term of this patent is extended or adjusted under 35 U.S.C. 154(b) by 0 days.

(21) Appl. No.: 09/676,066

(22) Filed: Sep. 29, 2000

Related U.S. Application Data

(60) Provisional application No. 60/162,535, filed on Oct. 29, 1999.

(51) Int. Cl.$^7$ ................................................ E04B 1/10
(52) U.S. Cl. .................. 52/233; 52/286; 52/748.11; 52/311.2; 403/408.1; 403/260; 403/187; 403/201; 403/286; 403/259; 256/65; 256/68
(58) Field of Search ................. 52/233, 286, 748.11, 52/311.2; 446/476, 85, 268, 34, 75; 411/265; 403/408.1, 260, 187, 201, 286, 259; 256/65, 68

(56) References Cited

U.S. PATENT DOCUMENTS

| | | | | |
|---|---|---|---|---|
| 5,081,811 A | * | 1/1992 | Sasaki | 52/227 |
| 5,253,458 A | * | 10/1993 | Christian | 52/233 |
| D399,680 S | * | 10/1998 | Mak | 446/75 |
| 6,023,895 A | * | 2/2000 | Anderson | 52/233 |
| 6,050,765 A | * | 4/2000 | McGovern et al. | 52/233 |

* cited by examiner

Primary Examiner—Carl D. Friedman
Assistant Examiner—Chi Q. Nguyen
(74) Attorney, Agent, or Firm—Emerson & Skeriotis; Roger D. Emerson; John M. Skeriotis

(57) ABSTRACT

A building system comprising interlocking log-like construction members to be used with or without screw-like fasteners. Various real-sized structures such as cabins, playhouses and tool sheds may be formed by perpendicular arrangement of recessed surfaces formed in the log-like members. A fastening system allows semi-permanent attachment of adjacent log-like members using a flanged fastener having an axial threaded recess and an axial threaded extension. When two fasteners are axially aligned, the axial threaded extension of one fastener may be engaged in the axial threaded recess of the other. The fasteners extend through holes in the recessed surfaces of the log-like members and thereby secure adjacent log-like members together.

24 Claims, 5 Drawing Sheets

LOG AND SCREW PIN BUILDING SYSTEM

This application claims the benefit of U.S. Provisional Application Ser. No. 60/162,535, filed Oct. 29, 1999 in Express Mail Label No. EL438309092 by the same inventor, Richard J. Englehart, entitled LOG AND SCREW PIN BUILDING SYSTEM.

BACKGROUND OF THE INVENTION

1. Field of Invention

This invention pertains to the art of methods and apparatuses for construction of various structures such as cabins, play-houses and tool sheds, and more specifically to methods and apparatuses for building structures using interlocking log-like members and screw-like fastening members.

2. Description of the Related Art

Playhouses, tool sheds and other such structures are known in the art to be made of molded plastic and comprise a pre-determined shape.

Climbing structures are also known in the art which incorporate modular components which may be arranged in a variety of configurations. However, these structures are generally formed of pre-treated lumber which is not only costly, but heavy as well.

Structures such as cabins may be formed of real wood logs, which again are very costly.

Toy building systems that children have enjoyed for many decades are Lincoln Logs® and the like. Such toy building systems employ wooden or plastic logs that are notched so that adjacent pieces may be perpendicularly nested together, similar to building a real log cabin. One aspect of these systems which is particularly appealing is that structures having a wide variety of configurations can be easily assembled and disassembled. However, the structures made by these systems are limited in size. Further, these toy systems do not provide means for maintaining adjacent logs in any permanent or semi-permanent relationship.

SUMMARY OF THE INVENTION

The present invention is directed to log-like members utilized to build structures and to the fastening members useful to selectively hold the log-like members together in a semi-permanent arrangement. Taken together, the log-like members and the fastening members form a building system.

In accordance with one aspect of the invention, a building system comprises a first building member having a first notched region including a generally planar recessed first surface having a first hole therein; a second building member having a second notched region including a generally planar recessed second surface having a second hole therein, the second notched region being adapted for nesting engagement with the first notched region when the first and second building members are disposed in a predetermined relative position and the first and second holes are axially aligned; and, means for selectively fastening the first and second building members in a semi-permanent relationship.

According to another aspect of the invention, the fastening means includes a first fastening member having a central axis and a threaded axial recess at a first end, and a second fastening member having a central axis and an axially extending threaded region at a second end, the threaded region of the second fastening member being dimensioned and configured for engagement within the threaded axial recess of the first fastening member.

According to another aspect of the invention the first building member comprises a hollow body.

According to another aspect of the invention the first building member comprises a body formed of polyethylene.

According to another aspect of the invention, a structure is formed from first and second building members being held in a predetermined relative position by first and second fastening members.

According to another aspect of the invention, a method for building a structure is provided. The method includes the steps of providing a first building member as described above, providing a second building member as described above, providing means for selectively fastening the first and second building members in a semi-permanent relationship as described above, positioning the first fastening member in the first hole; positioning the second notched region of the second building member into nesting engagement with the first notched region of the first building member; positioning the second fastening member in the second hole; and, rotating the second fastening member so that the axially extending threaded region is engaged within the threaded axial recess of the first fastening member.

According to another aspect of the invention, a fastening assembly is provided comprising a first fastening member having a length, a first end, a second end, a central axis, and a threaded axial recess at the first end; and, a second fastening member having a length, a first end, a second end, a central axis, and an axially extending threaded region at the second end, the axially extending threaded region being engaged within the threaded axial recess of the first fastening member.

One advantage of the present invention is the light-weight nature of the log-like members which eliminates the need for riggers such as front end loaders and booms during the erection of the structure. The assembly could be done manually with no tools needed.

Another advantage of the invention is the safety factor. Should a log-like member of the present invention fall on an individual, there would be little or no injury in comparison to what would occur from a falling natural log.

Another advantage of the invention is the easy modification or moving (disassembly and reconstruction) of a unit made from the log-like members of the present invention.

Another advantage of the invention is the innovative fasteners which allow quick and easy semi-permanent structures to be built.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
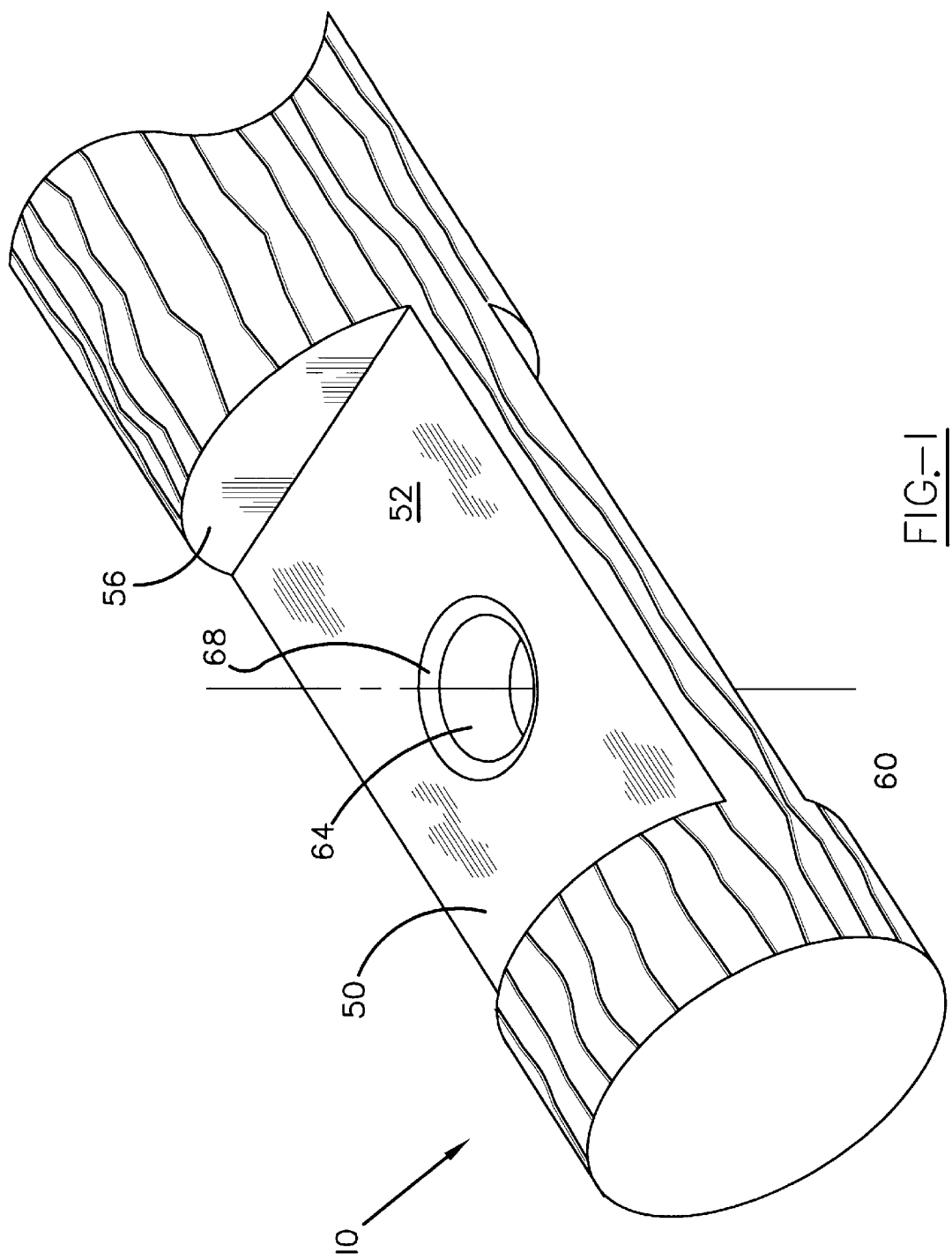
FIG. 1 is a partial perspective view of a log-like member according to the present invention.
Figure 2:
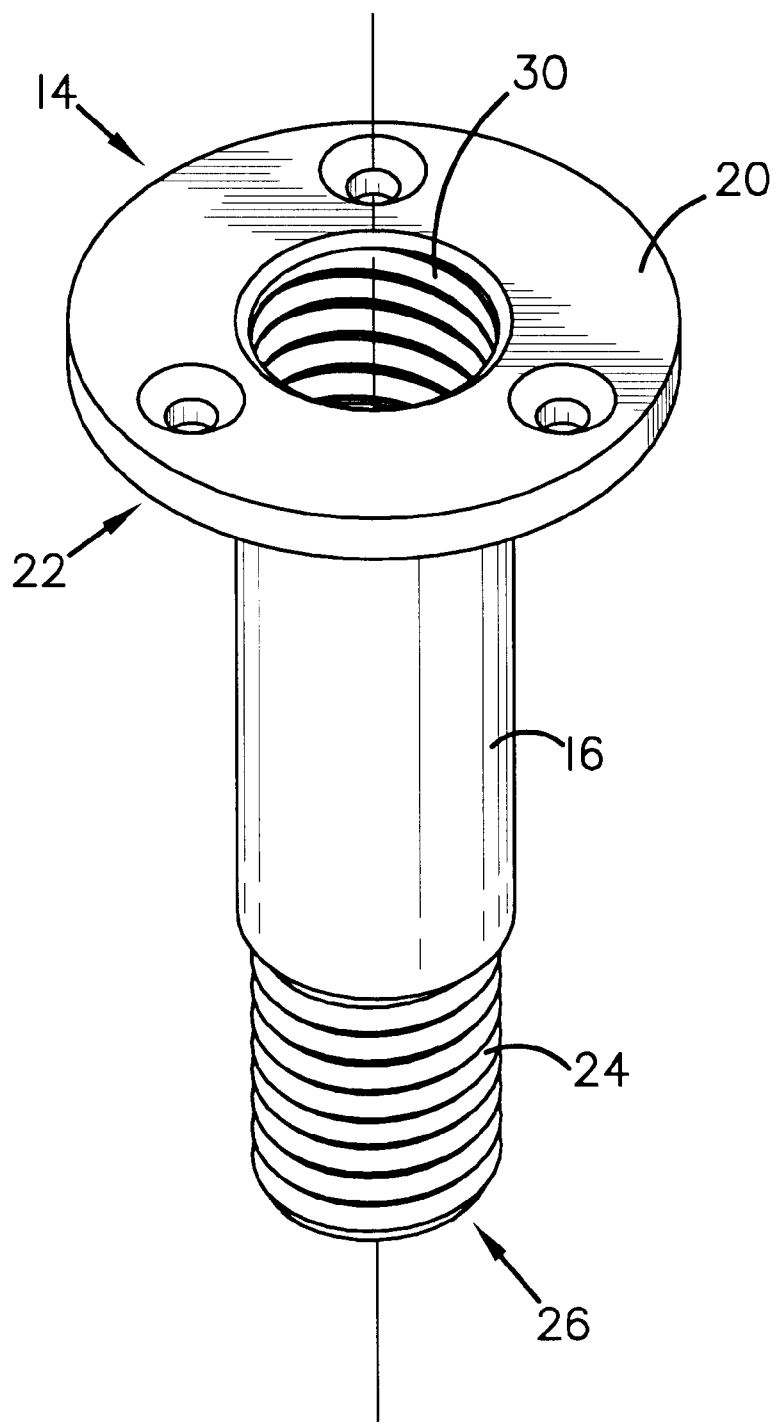
FIG. 2 is a perspective view of a first embodiment of a screw-like fastening member according to the invention.

Referring now to FIGS. 1–5 wherein the showings are for purposes of illustrating a preferred embodiment of the invention only and not for purposes of limiting the same, the present invention is directed to the log-like members 10 and the screw-like fastening members 14 which together form a building system.

The log-like members 10 may be formed of a light-weight material and fashioned to have a brick, wood board, stone or other appearance. The preferred material is polyethylene plastic, but other material capable of performing the objects of the invention may be utilized as well.

The screw-like fastening member 14 includes a cylindrical body 16 having a flange 20 at a first end 22 and an axially extending threaded region 24 at a second end 26. The cylindrical body 16 includes a threaded axial recess 30 at the flanged end 22. When two fastening members 14A, 14B are axially aligned, the axially extending threaded region 24A of the first fastening member 14A is adapted to be engagedly received within the threaded recess 30B of the second fastening member 14B. In one embodiment of the present invention, the fastening members 14 are utilized to selectively secure adjacent log-like members 10A, 10B together. However, it is an object of the present invention to provide screw-like members 14 that may selectively fasten together other objects 34, not necessarily limited to the log-like members 10 described in this disclosure.

Figure 3:
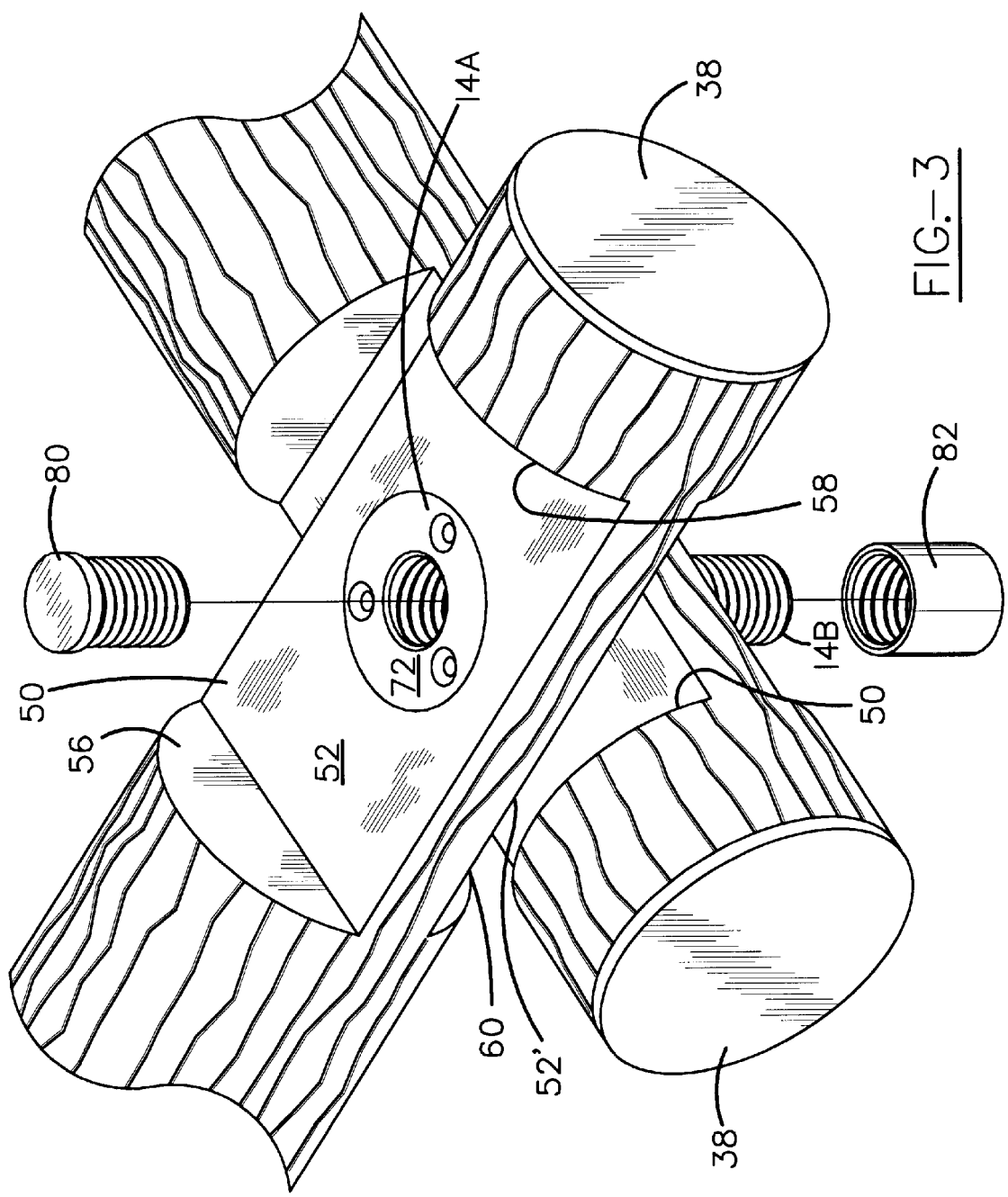
FIG. 3 is a perspective view of adjacent log-like members.
Figure 4:
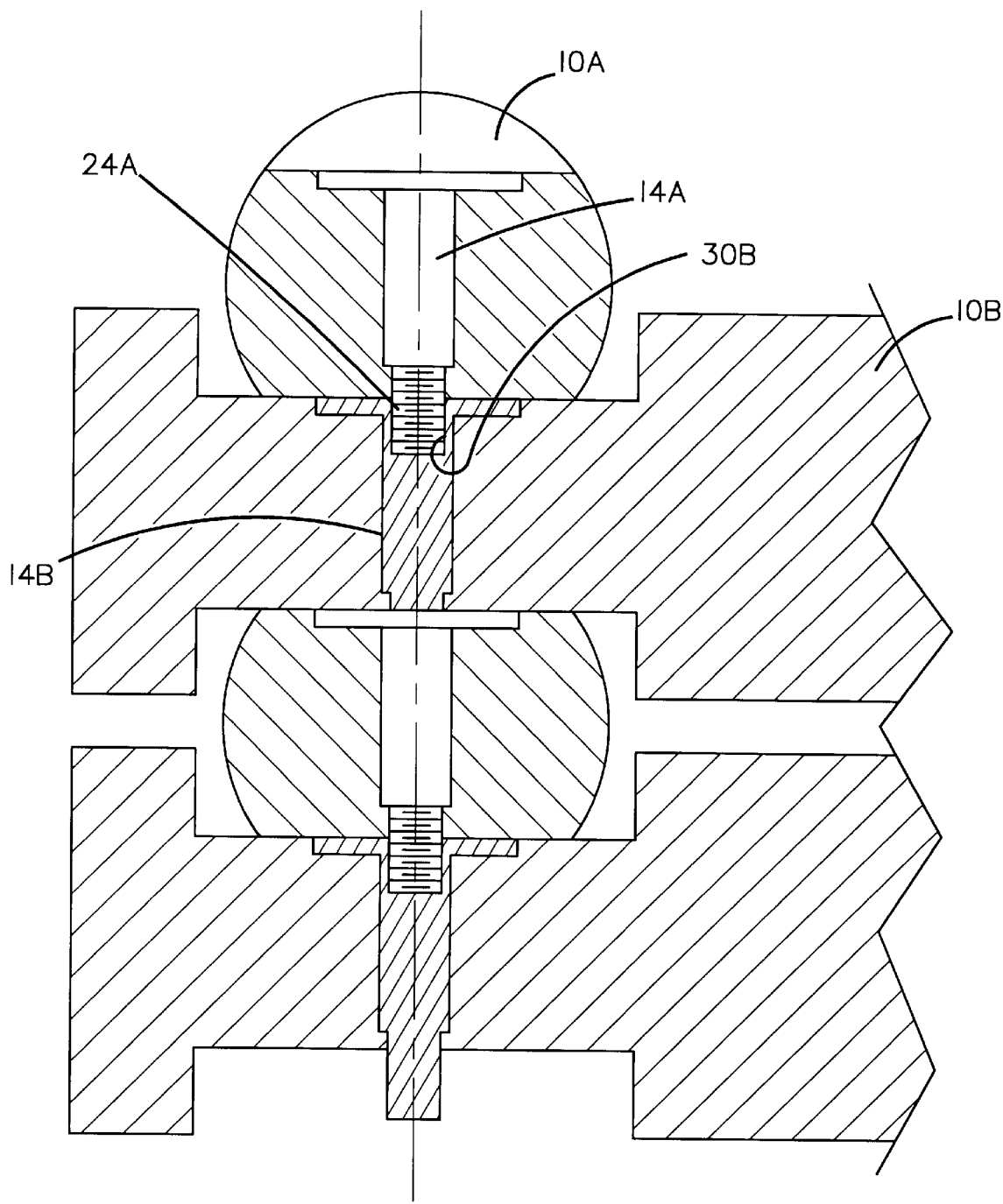
FIG. 4 is a partial cross-sectional view of a plurality of log-like members and screw-like fasteners that form the building system of the present invention; and, FIG. 5 is a partial cross-sectional view of the screw-like fasteners of the present invention being used as fasteners for objects other than the log-like members.
Figure 5:
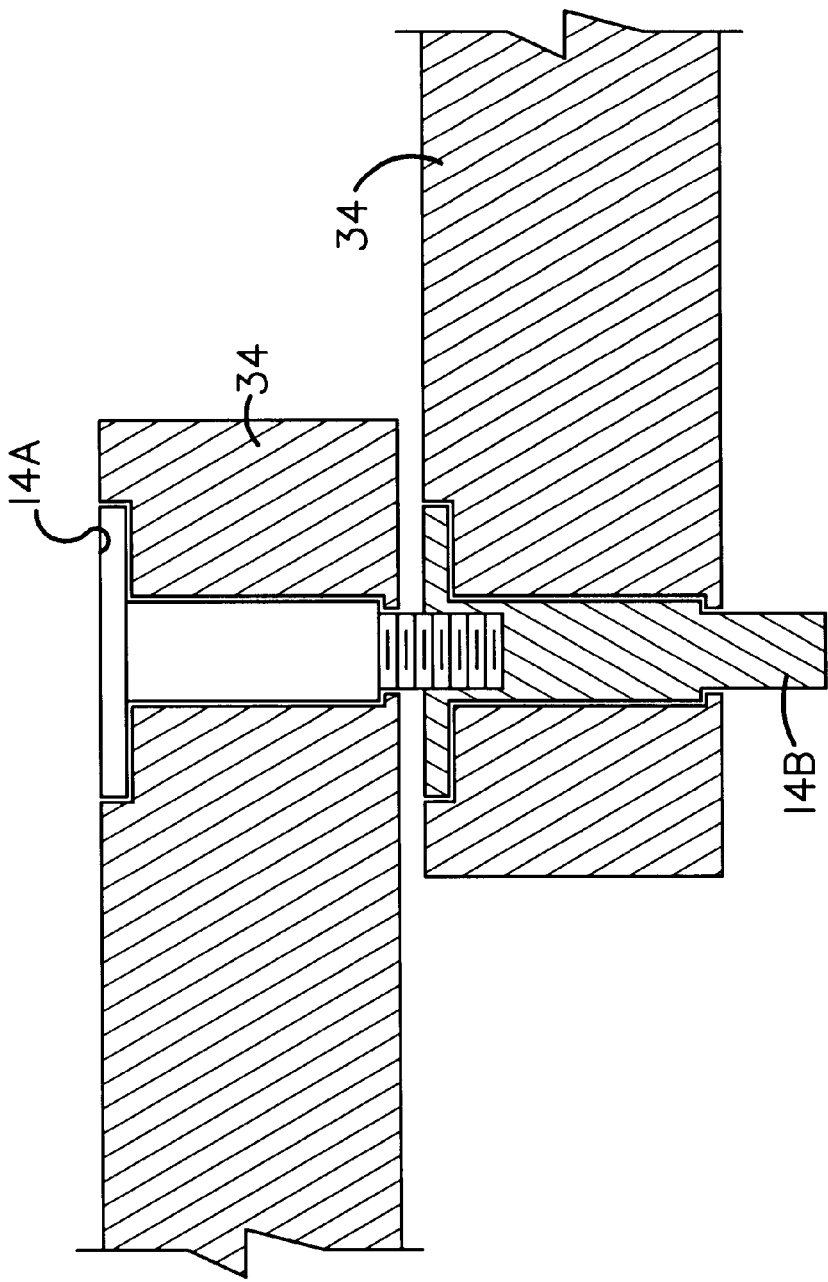

The log-like members 10 are preferably hollow, modified cylinders that are capped at the ends 38. The preferred construction of the log-like members includes notched regions 50 at predetermined intervals along the length. The notched region 50 is characterized by a generally planar recessed surface 52 disposed between two side planar surfaces 56, 58. The log-like member 10 may further include similar notched regions 60 opposite the first notched regions 50. The similar notched regions 60 therefore include another planar recessed surface 52' as shown in FIG. 3. The log-like members 10 can be arranged in perpendicular fashion with adjacent log-like members 10 being nested together at the notched regions 50, 60. It is an object of the present invention to incorporate means to selectively fasten adjacent log-like members 10 together.

In a preferred embodiment, the planar recessed surfaces 52 of the notched regions 50 each have a through-hole 64 in them. In the most preferred embodiment, each through-hole 64 is encircled with a recessed seat 68 adapted to engage the flange 20 of a screw-like fastening member 14. In the preferred embodiment, when the flange 20 is engaged on the seat 68, the top surface 72 of the fastening member 14 is flush with the recessed surface 52 of the notched region 50. As the screw-like fastener 14 is tightened, flange 20 applies pressure to the log-like member with which it is in contact.

In the preferred embodiment, the fastening member 14 is a hollow pipe or rigid hollow tubing having an axial opening that extends from first end 22 to second end 26. This construction allows for the fastening members 14 to be stored end to end on a rod. However, it is within the scope of the present invention to provide a solid stock body with the axial recess 30 described above.

Also in the preferred embodiment, the flange 20 is provided with means for rotation of the fastening member 14 about its axis. Preferably, the rotation means is a plurality of spaced openings for manual turning of the fastening member 14. Other means, such as slots, ridges, and the like may be provided so that the fastening member may be manually or mechanically rotated.

Preferably, the log-like members 10 are "life size", meaning that they would be utilized to form structures large enough for human occupation. It is within the scope of the present invention to provide log-like members in a variety of diameters and lengths to accomplish a variety of construction needs. Likewise, the fastening members would be sized appropriately to accommodate a variety of log-like member sizes.

The preferred building system of the present invention includes utilization of both log-like members 10 and screw-like fastening members 14. Although the log-like members 10 may be arranged to provide a structure without using the fastening members 14, the preferred embodiment includes the fastening members 14 to provide stability to the structure.

It is within the scope of the present invention to provide capping means such as top cap 80 or bottom cap 82 to give a "finished look" to the structure.

The preferred method of producing the log-like members 10 of the invention includes the steps of forming a hollow tubular object, such as that formed by the process of rotational molding.

The invention has been described with reference to preferred embodiment. Obviously, modifications and alterations will occur to others upon a reading and understanding of this specification. It is intended to include all such modifications and alternations in so far as they come within the scope of the appended claims or the equivalence thereof.

Having thus described the invention, it is now claimed:

1. A building system comprising:
    a first building member having a length as measured between first and second ends and a first notched region including a generally planar recessed first surface extending a portion of the length, the first surface having a first hole therein, wherein said first hole is pre-formed;
    a second building member having a length as measured between first and second ends and a second notched region including a generally planar recessed second surface extending a portion of the length, the second surface having a second hole therein, wherein said second hole is pre-formed, the second notched region being adapted for nesting engagement with the first notched region when the first and second building members are disposed in a predetermined relative position and the first and second holes are axially aligned; and,
    means for selectively fastening the first and second building members in a semi-permanent relationship, the fastening means including a first fastening member having a length, a first end, a second end, a central axis, and a threaded axial recess at the first end, the first fastening member being dimensioned and configured for reception within the first hole, the fastening means further including a second fastening member having a first end, a second end, a length, a central axis, and an axially extending threaded region at the second end, the second fastening member being dimensioned and configured for reception within the second hole and the threaded region of the second fastening member being dimensioned and configured for engagement within the threaded axial recess of the first fastening member.

2. The building system of claim 1 wherein:

the second hole is provided with a recessed seat; and, the second fastening member includes a flange at the first end, the flange being dimensioned and configured for engagement on the recessed seat.

3. The building system of claim 2 wherein the flange and the recessed seat are dimensioned and configured so that a top surface of the flange is flush with the second surface when the flange is engaged on the seat.

4. The building system of claim 2 wherein the flange is provided with means for manual rotation of the second fastening member about its axis.

5. The building system of claim 4 wherein the rotation means includes a plurality of slots.

6. The building system of claim 4 wherein the rotation means includes a plurality of ridges.

7. The building system of claim 1 wherein the second fastening member includes a threaded axial recess at the first end thereof.

8. The building system of claim 1 wherein the first building member comprises a hollow body and wherein the first and second ends are capped.

9. The building system of claim 1 wherein the first building member comprises a body formed of polyethylene.

10. The building system of claim 1 wherein the second building member includes a third notched region including a generally planar recessed third surface being spaced from and parallel to the second surface and wherein the second hole extends through the third surface.

11. The building system of claim 1 wherein the first building member comprises a cylindrical body.

12. A structure comprising:

a first building member having a length as measured between first and second ends and a first notched region including a generally planar recessed first surface extending a portion of the length, the first surface having a hole therein;

a second building member having a length as measured between first and second ends and a second notched region including a generally planar recessed second surface extending a portion of the length, the second surface having a second hole therein, the second notched region being in nesting engagement with the first notched region whereby the first and second building members are disposed in a predetermined relative position and the first and second holes are axially aligned; and, means for selectively fastening the two building members in a semi-permanent relationship, the fastening means including a first fastening member having a length, a first end, a second end, a central axis, and a threaded axial recess at the first end, the first fastening member being received within the first hole, the fastening means further including a second fastening member having a first end, a second end, a length, a central axis, and an axially extending threaded region at the second end, the second fastening member being received within the second hole and the threaded region of the second fastening member being engaged within the threaded axial recess of the first fastening member.

13. The structure of claim 12 wherein:

the second hole is provided with a recessed seat; and, the second fastening member includes a flange at the first end, the flange being engaged on the recessed seat.

14. The structure of claim 13 wherein a top surface of the flange is flush with the second surface.

15. The structure of claim 13 wherein the flange is provided with means for manual rotation of the second fastening member about its axis.

16. The structure of claim 15 wherein the rotation means includes a plurality of slots.

17. The structure of claim 15 wherein the rotation means includes a plurality of ridges.

18. The structure of claim 12 wherein the second fastening member includes a threaded axial recess at the first end thereof.

19. The structure of claim 12 wherein the first building member comprises a hollow body and wherein the first and second ends are capped.

20. The structure of claim 12 wherein the first building member comprises a body formed of polyethylene.

21. The structure of claim 12 wherein the second building member includes a third notched region including a generally planar recessed third surface being spaced from and parallel to the second surface and wherein the second hole extends through the third surface.

22. The structure of claim 12 wherein the first building member comprises a cylindrical body.

23. A method for building a structure comprising the steps of:

providing a first building member having a length as measured between first and second ends and a first notched region including a generally planar recessed first surface extending a portion of the length, the first surface having a hole therein;

providing a second building having a length as measured between first and second ends and a second notched region including a generally planar recessed second surface extending a portion of the length, the second surface having a second hole therein, the second notched region being adapted for nesting engagement with the first notched region when the first and second building members are disposed in a predetermined relative position and the first and second holes are axially aligned;

providing means for selectively fastening the first and second building members in a semi-permanent relationship, the fastening means including a first fastening member having a length, a first end, a second end, a central axis, and a threaded axial recess at the first end, the first fastening member being dimensioned and configured for reception with the first hole, the fastening means further including a second fastening member having a first end, a second end, a length, a central axis, and an axially extending threaded region at the second end, the second fastening member being dimensioned and configured for reception within the second hole and the threaded region of the second fastening member being dimensioned and configured for engagement with the threaded axial recess of the first fastening member;

positioning the first fastening member in the first hole;

positioning the second notched region of the second building member into nesting engagement with the first notched region of the first building member;

positioning the second fastening member in the second hole; and, rotating the second fastening member so that the axially extending threaded region is engaged within the threaded axial recess of the first fastening member.

24. The method of claim 23 wherein the second fastening member includes a flange at the first end which includes means for manual rotation of the second fastening member about its axis, and wherein the step of rotating the second fastening member further includes:

utilizing the manual rotation means to rotate the second fasting member.

* * * * *